United States Patent Office 3,810,737
Patented May 14, 1974

3,810,737
METHOD FOR MEASURING ALCOHOLIC CONTENT OF A LIQUID
Kenneth R. Geist and James E. Walsh, Milwaukee, Wis., assignor of a fractional part interest to John J. Brust, Slinger, Wis.
Filed Dec. 29, 1971, Ser. No. 213,524
Int. Cl. G01n 31/00
U.S. Cl. 23—230 R
2 Claims

ABSTRACT OF THE DISCLOSURE

Apparatus for measuring the alcoholic content of a liquid sample by means of a liquid reagent comprises a stoppered flask having a liquid-receiving recess which is divided into a lower section for receiving the liquid sample and an upper section of greater diameter than the lower section for receiving the liquid reagent. Scale means are provided for the flask and indicate alcoholic content of the sample. The scale means are disposed so that the zero point thereof indicative of no alcoholic content is aligned with the interface between the upper and lower sections of the flask.

The method comprises the steps of adding a predetermined amount of sample liquid to fill the lower section, adding approximately four times that amount of reagent in the form of water saturated with butynal or pentynol, mixing the sample and reagent by shaking the stoppered flask, letting the mixture settle, and reading the scale to determine where an interface between two different colored liquids is located.

BACKGROUND OF THE INVENTION

First of use

This invention relates generally to apparatus and a method for measuring the amount of a constituent component in a liquid sample, such as the alcoholic content of a liquid.

Description of the prior art

In some instances it is necessary to measure the amount (by percentage of volume) of a constitutent component in a liquid. In the art and science of fermenting wine, for example, it is necessary at various stages in the fermentation process to test or measure the alcoholic content of the wine to determine if it is within a desired range and to undertake various corrective measures in the fermentation process if it is not. In commercial wineries, it is the practice to withdraw a sample of wine from the fermentation casks and to subject it to tests using laboratory facilities, instruments and chemical reagents. However, making wine at home has become an increasingly popular and widespread activity and, while alcoholic content testing must be carried out to insure a quality product, elaborate testing facilities and special chemicals are unavailable or too costly for the average home winemaker. It is desirable, therefore, to provide simple apparatus and a simple method for testing the alcoholic beverages which is readily available to home winemakers, economical, and easy to use. U.S. Pat. 1,689,901 to Williams issued Oct. 30, 1928 discloses an early attempt to provide an alcohol tester for whiskey which employed a specially graduated flask and a special, somewhat complicated reagent which, in some instances required heating in order to obtain correct readings, a special chart against which flask readings were to be compared and some skill in making the test. However, it is desirable to provide improved apparatus and methods.

SUMMARY OF THE PRESENT INVENTION

In accordance with the present invention, there are provided improved apparatus and methods for testing or measuring the alcoholic content of a liquid, such as wine, by means of a liquid reagent.

Apparatus in accordance with the invention comprises a supporting stand, a flask, capable of being stoppered, and having a liquid-receiving recess therein which is divided into a lower section for receiving a sample of the liquid to be tested and an upper section of greater diameter than the lower section for receiving the liquid reagent. The lower section of the recess is in the form of a cylinder adapted to receive a sample of predetermined volume, i.e., on the order of 20 milliliters. The upper section is in the form of a cylinder of substantially larger diameter and volume than the lower cylinder and joined thereto by a conic section. The volume of the upper section is at least four times that of the lower section. A scale comprising indicia graduated or calibrated to give a direct reading in percentage of volume of alcohol is disposed on the supporting stand adjacent the flask so that its zero point is aligned with the interface between the upper and lower sections of the recess and so that its other indicia are aligned alongside the lower section.

The liquid reagent used with the flask takes the form of a liquid consisting of water saturated with butynal or pentynol, is of a different color than the sample and has a lower specific gravity than the sample.

The method in accordance with the invention comprises the steps of providing a flask of the aforesaid character; filling the lower section of the recess thereof with a sample of the liquid to be tested (i.e., adding a sample of predetermined volume to the flask); adding about four times that volume of reagent to the flask; stoppering and shaking the flask to mix the sample and the reagent to effect absorption of all alcohol (if any) from the sample by the reagent; letting the mixture settle so that the reagent and sample separate; and reading the point on the scale opposite the interface between the two to ascertain directly the alcoholic content in percentage of volume.

DRAWINGS

DESCRIPTION OF A PREFERRED EMBODIMENT APPARATUS

Figure 2:
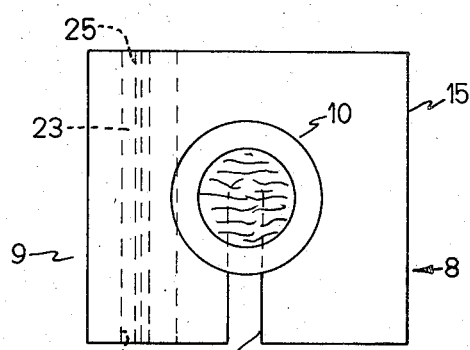
FIG. 2 is a top plan view of the apparatus shown in FIG. 1 with the stopper removed from the flask.
Figure 1:
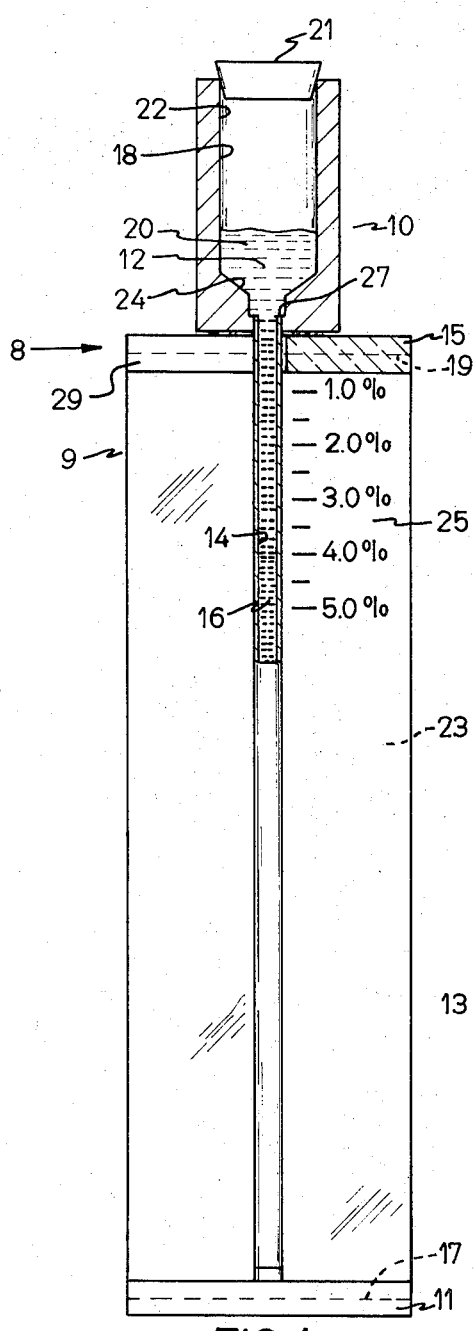
FIG. 1 is a front elevational view, partly in cross section, of apparatus in accordance with the invention showing a flask filled with a liquid sample and reagent prior to mixture thereof.
Figure 3:
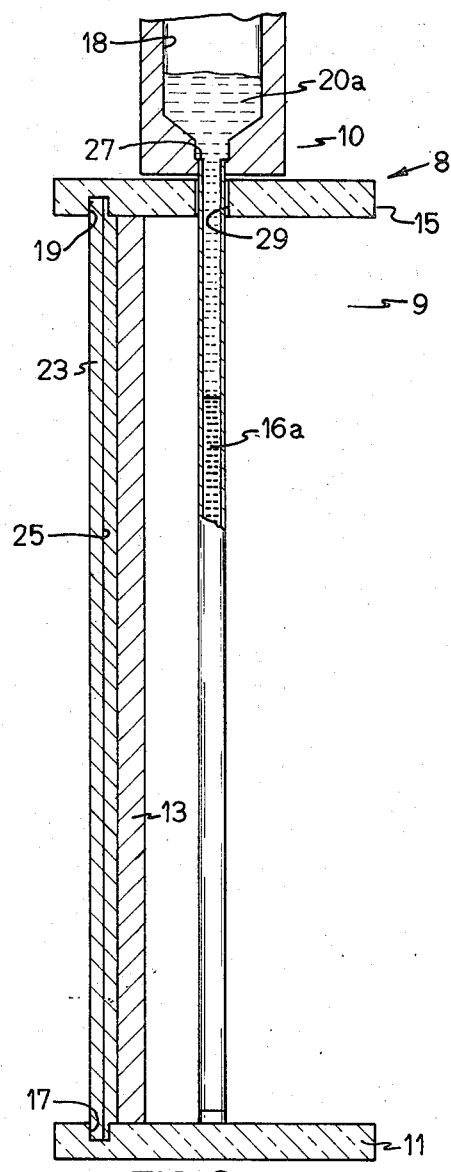
FIG. 3 is a side elevational view, partly in cross section of the apparatus shown in FIGS. 1 and 2 but showing the flask contents after mixture.

Referring to FIGS. 1, 2 and 3, the numeral 8 designates apparatus in accordance with the invention for testing or measuring the alcoholic content (in percentage of volume) of a liquid such as wine.

Apparatus 8 comprises a supporting stand 9 on which a flask 10 is removably mounted.

Supporting stand 9 comprises a base portion 11, an upright section 13 and a top section 15. Upright section 13 is preferably fabricated of transparent plastic. Base portion 11 and top section 15 are provided with grooves 17 and 19 therein which accommodate a rectangular scale member 23 on which a scale 25 is provided. Top section 15 is provided with a recess 29 inwardly from one edge for accommodating the stem of flask 10 in supporting relationship.

Flask 10 is preferably fabricated of strong transparent plastic, although glass could be used but is more fragile. Flask 10 is, for example, on the order of 17 inches high and 2 inches in diameter at its widest point. Flask 10 is provided with a liquid-receiving recess 12 therein which comprises or is divided into a lower section 14 for receiving a sample 16 of a liquid to be tested and an upper section 18 for receiving a quantity of liquid reagent 20 for carrying out a test. Recess 12 of flask 10 is adapted to be closed off by means of a removable stopper 21, shown in place in FIG. 1, which is preferably made of flexible material such as rubber.

Lower section 14 of recess 12 is in the form of an elongated cylinder or tube on the order of about ¼ inch in inside diameter and about 14 inches long. Upper section 18 of recess 12 comprises a portion 22 in the form of a cylinder about 1⅜ inches in inside diameter and about 2½ inches long and a portion 24 in the form of a conic section 24 joining portion 22 and lower section 14 to provide an annular shoulder 27 in flask 10. Upper section 18 of recess 12 has a volume well in excess of four times the volume of lower section 14.

Flask 10 is provided with scale 25 which comprises indicia or numbers, as shown in FIG. 1, and which is graduated or calibrated with respect to the volumetric capacity of lower section 14 of recess 12 so as to provide a direct reading in percentage of volume of alcohol contained in liquid sample 16. The indicia of scale 25 are arranged so that the 0 (zero) point thereof would be aligned with shoulder 27 in flask 10, i.e., where upper section 18 joins lower section 14 of recess 12. The other indicia of scale means 25 are arranged vertically downward from zero alongside lower section 14 of recess 12 but in ascending numerical order. Preferably, the indicia in scale means 25 are etched, engraved or cast on the surface of scale member 23 but they could be provided on a decal label (not shown) affixed thereto. Scale member 23 is removable from stand 9 and replacable with a differently calibrated scale, if desired.

Liquid reagent 20 for use with flask 10 takes the form of water which is saturated with butynal or pentynol and is normally transparent but of a different color than the wine sample or other liquid sample to be tested. Butynal and pentynol are commercially available in liquid form and have the ability to absorb alcohol when mixed therewith. Reagent 20 has a lower specific gravity than the liquid normally being tested, i.e., wine or other alcoholic beverages and will float thereon.

Method

The method of testing a liquid to determine or measure the alcoholic content thereof (in terms of percentage of volume) in accordance with the invention and by means of flask 10, liquid reagent 20 and scale 25 comprises the following steps.

Referring to FIG. 1, lower section 14 of recess 12 of flask 10 is completely filled with sample 16 of the liquid to be tested. Because of the construction of flask 10, i.e., the marked size distinction at shoulder 27 between lower section 14 and upper section 18 of recess 12, rapid and accurate sample measurement is highly visible and easily and automatically carried out. If flask 10 is cylindrical, magnification occurs through the transparent side of the flask which aids in adding the correct amount of sample liquid.

Liquid reagent 20 is then added to flask 10 in an amount well in excess of the volume of liquid sample 16. An exact amount of reagent is not required and, again, because of the construction of flask 10, filling it with reagent to the approximate level shown in FIG. 1 ensures at least a correct amount.

After addition of liquid reagent 20 to liquid sample 16, stopper 21 is placed on flask 10 to seal recess 12 and the flask is shaken or agitated vigorously to mix the reagent and the sample. As mixing takes place, the butynal or pentynol (whichever is used) in the reagent absorbs all alcohol that may be present in liquid sample 16.

Subsequent to mixing, the mixture is allowed to settle and separate, as shown in FIG. 3. The reagent with alcohol from sample 16 absorbed therein, and designated 20a in FIG. 3, rises to the top and the sample, with all alcohol removed therefrom and designated 16a in FIG. 3, settles to the bottom. Comparison of FIGS. 1 and 3 shows that reagent 20a has increased in volume by the same amount that sample 16a has decreased in volume, i.e., by the volumetric amount of alcohol originally contained in sample 16. Since reagent 20a is different in color than sample 16a, the interface between the two liquids is clearly visible and is located somewhere in lower section 14 of recess 12, i.e., below shoulder 27 and aligned with some point on scale 25.

With flask 10 held level in place on stand 9 this point on scale 25 is read and gives a direct indication on readout of the percentage (by volume) of alcohol that was contained in the sample liquid 16 undergoing test.

It is apparent from the foregoing that apparatus in accordance with the invention is simple and economical to fabricate, that it is easy to use and insures correct sample and reagent measurement, that the result of the test is definite, highly visible and provides direct information without the need for conversion tables. In the embodiment shown, scale 25 is provided on interchangeable scale member 23. However, if preferred, scale 25 could be attached directly to the lower stem of flask 10.

In the foregoing description, the constituent component in the liquid sample being tested is alcohol. However, other constituent components in liquid samples could be tested for provided the appropriate reagent was used and scale 25 was calibrated accordingly.

What is claimed is:

1. A method for ascertaining the amount of alcohol in a sample of wine comprising the steps of:
    mixing a sample of wine with a liquid reagent comprising an agent selected from a class of components consisting of butynal and pentynol, whereby the alcohol in said sample of wine is absorbed by said reagent, and measuring the amount of residuum left from said sample of wine to determine the amount of alcohol in said sample of wine.

2. A method for ascertaining the percentage by volume of alcohol in a sample of wine comprising the steps of:
    mixing a sample of wine of predetermined volume with a greater volume of a liquid reagent consisting of an agent selected from a class of components consisting of butynal and pentynol, whereby the alcohol in said sample of wine is absorbed by said reagent, and measuring the volume of the residuum left from said sample of wine to determine the percentage by volume of alcohol in said sample of wine.

References Cited

UNITED STATES PATENTS

| | | | |
|---|---|---|---|
| 1,782,644 | 11/1930 | Brenneman | 23—292 |
| 1,428,020 | 9/1922 | Farrington | 23—258 |
| 1,333,905 | 3/1920 | Dehn | 23—230 R |
| 1,658,950 | 2/1928 | Stein | 23—253 X |
| 1,689,901 | 10/1928 | Williams | 23—230 R |
| 3,705,015 | 12/1972 | Bono et al. | 23—253 R |

OTHER REFERENCES

"Selected Laboratory Equipment," catalog No. 50, Schaar & Co., Chicago, Ill., 1950, p. 18.

MORRIS O. WOLK, Primary Examiner

T. W. HAGAN, Assistant Examiner

U.S. Cl. X.R.

23—259; 195—103.5 R